C. P. CASS.
DUPLEX PRESSURE STRAIGHT AIR BRAKE.
APPLICATION FILED MAY 4, 1907.
977,164.
Patented Nov. 29, 1910.
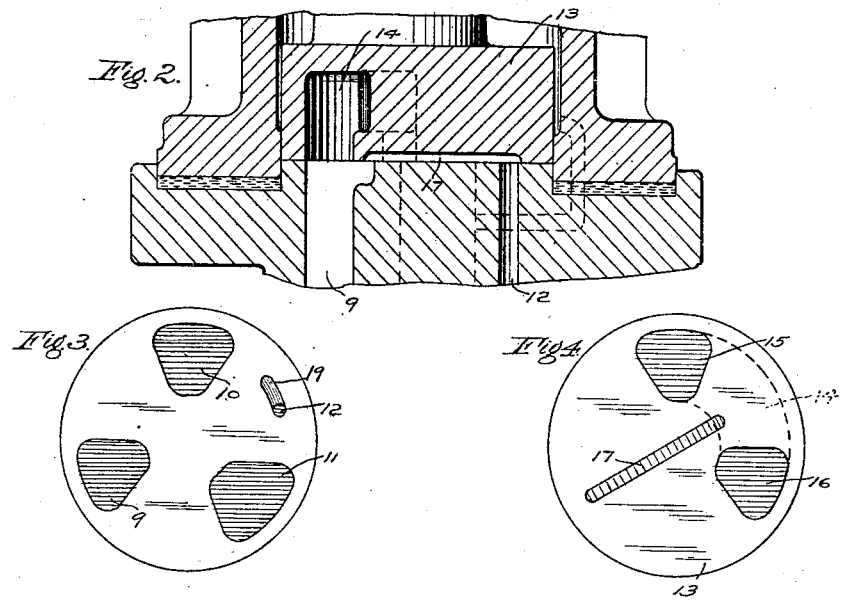
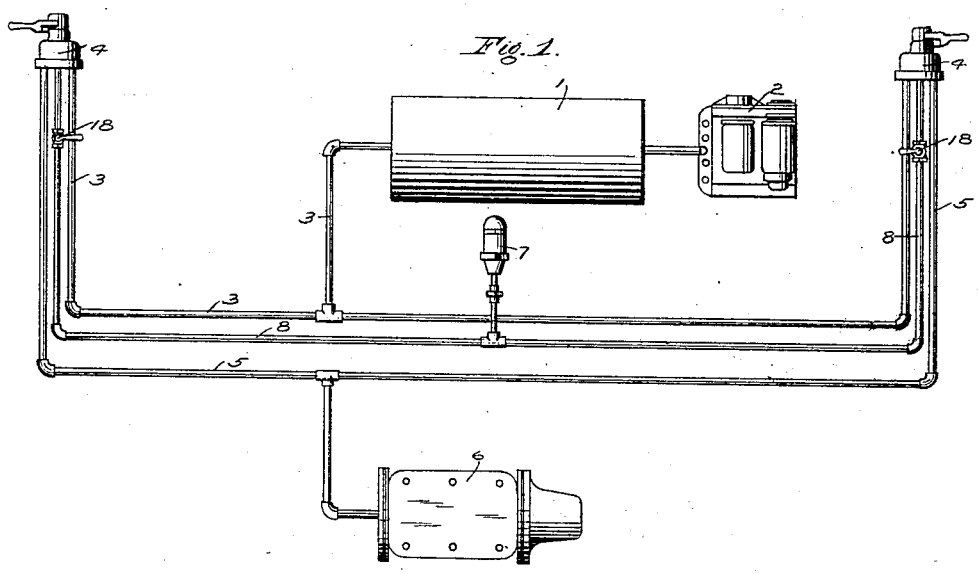
WITNESSES
Wm. H. Cady
J. S. Custer
INVENTOR
Christopher P. Cass
by E. Wright
Att'y.

UNITED STATES PATENT OFFICE.

CHRISTOPHER P. CASS, OF ST. LOUIS, MISSOURI, ASSIGNOR TO THE WESTINGHOUSE AIR BRAKE COMPANY, OF PITTSBURG, PENNSYLVANIA, A CORPORATION OF PENNSYLVANIA.

DUPLEX-PRESSURE STRAIGHT-AIR BRAKE.

977,164.     Specification of Letters Patent.     Patented Nov. 29, 1910.

Application filed May 4, 1907. Serial No. 371,888.

*To all whom it may concern:*

Be it known that I, CHRISTOPHER P. CASS, a citizen of the United States, residing at St. Louis, State of Missouri, have invented new and useful Improvements in Duplex-Pressure Straight-Air Brakes, of which the following is a specification.

My invention relates to fluid pressure brakes, and particularly to what is known as straight air brakes.

The principal object of my invention is to provide improved means for limiting the maximum degree of brake cylinder pressure in service applications of the brakes, while in emergency applications a greater maximum pressure may be obtained. For this purpose my improvements comprise means, such as a safety or blow down valve, which may be set to the desired maximum degree of pressure, and means, preferably the motorman's brake valve, adapted to establish communication between the safety valve and the brake cylinder in service applications of the brakes.

In the accompanying drawings, Figure 1 is a diagrammatic elevation of a motor car straight air brake equipment embodying one form of my invention; Fig. 2 a central sectional view of the motorman's brake valve, showing the position of ports when in lap position, with the brake cylinder open to the safety valve; Fig. 3 a plan view of the rotary valve seat of the brake valve, and Fig. 4 a face view of the rotary valve, showing the arrangement of cavities.

According to the construction shown, the car air brake equipment comprises a reservoir 1, which may be charged with air in any desired manner, such as by a motor driven pump 2, a reservoir pipe 3 extending from said reservoir to a motorman's brake valve 4, preferably one at each end of the car, a straight air pipe 5 extending through the car and connected to the brake valves and to the brake cylinder 6, and a safety or blow down valve 7 connected by a pipe 8 to said brake valves.

The valve seat of the brake valve is provided with the usual ports 9, 10 and 11 communicating respectively with the straight air pipe 5, the exhaust, and reservoir pipe 3, and in addition, has a port 12 communicating with the safety valve pipe 8. The rotary valve 13 is provided with cavity 14 having openings 15 and 16 on the valve face, adapted to register with the ports 9, 10 and 11, and a radially arranged groove or cavity 17 adapted to connect the straight air pipe port 9 with safety valve port 12 in lap position.

Service applications of the brakes may be made in the usual way, by moving the brake valve handle to service position, in which the reservoir pipe 3 is connected to the brake cylinder pipe 5 by the cavity 14 in the rotary valve 13. On returning the brake valve handle to lap position, communication is established between the safety valve pipe 8 and the brake cylinder pipe 5, and consequently, when the brake cylinder pressure rises above the desired degree for which the safety valve is set, the excess pressure is relieved through the valve.

So long as the brake valve handle remains in service position, the brake cylinder pressure may be increased up to the limit of the pressure of air in the reservoir, and the pressure may then be reduced to the predetermined limit, by moving the brake valve handle to service lap position. If desired, the safety valve may be open to the brake cylinder in the movement of the brake valve handle between service position and lap, and in this case the port 12 is provided with an extension 19 which registers with the cavity 17 when the valve is in service position, so that the brake cylinder pressure will not rise above the limit, for which the safety valve is set, when the valve is in service position. In the emergency position, the safety valve is cut off from the brake cylinder, and full reservoir pressure may be obtained in the brake cylinder.

It is preferable to provide cut out cocks 18 in the safety valve pipe 8 near the brake valves 4, for the purpose of closing communication from the safety valve to a brake valve not in use, so that any possibility of communication being open through the dead brake valve to the safety valve will be obviated, in case of an emergency application of the brakes.

Having now described my invention, what I claim as new and desire to secure by Letters Patent is:—

1. In a fluid pressure brake, the combination with a reservoir, brake cylinder, straight air pipe and a brake valve for controlling the supply of air from the reservoir to the brake cylinder, of means opening to the brake cylinder in service applications for limiting the brake cylinder pressure.

2. In a straight air brake system, the combination with a reservoir, brake cylinder, straight air pipe and a brake valve for controlling the supply of air from the reservoir to the brake cylinder, of a safety valve adapted to be connected to the brake cylinder in service applications for limiting the brake cylinder pressure to a predetermined degree.

3. In a straight air brake system, the combination with a reservoir, brake cylinder, straight air pipe and a brake valve for controlling the supply of air from the reservoir to the brake cylinder, of a safety valve for limiting the brake cylinder pressure and means in said brake valve for opening communication between said safety valve and the brake cylinder in service applications of the brakes.

4. In a straight air brake system, the combination with a reservoir, brake cylinder, straight air pipe and a brake valve for controlling the supply of air from the reservoir to the brake cylinder, of a safety valve for limiting the brake cylinder pressure and means in said brake valve for opening communication between said safety valve and the brake cylinder in service applications of the brakes and for closing said communication in emergency applications.

5. In a straight air brake system, the combination with a reservoir, brake cylinder, straight air pipe and a brake valve for controlling the supply of air from the reservoir to the brake cylinder, of a safety valve for limiting the brake cylinder pressure, and means in said brake valve for establishing communication between the safety valve and brake cylinder in the lap position of the brake valve.

6. In a fluid pressure brake, the combination with a brake cylinder and a safety valve for limiting the brake cylinder pressure, of a brake valve for controlling communication from the brake cylinder to said safety valve.

In testimony whereof I have hereunto set my hand.

CHRISTOPHER P. CASS.

Witnesses:
C. H. BECK,
C. W. TOWNSEND.